Aug. 17, 1954  J. E. HORSTE  2,686,571
MOVABLY SUPPORTED ENGINE AND DRIVE ASSEMBLY
AND WHEEL DRIVE CONTROL THEREFOR
Filed May 26, 1952  2 Sheets-Sheet 1
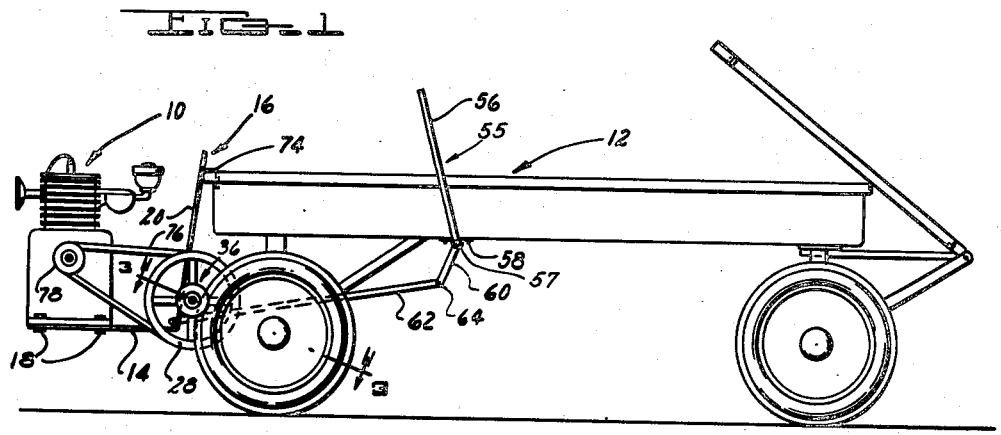
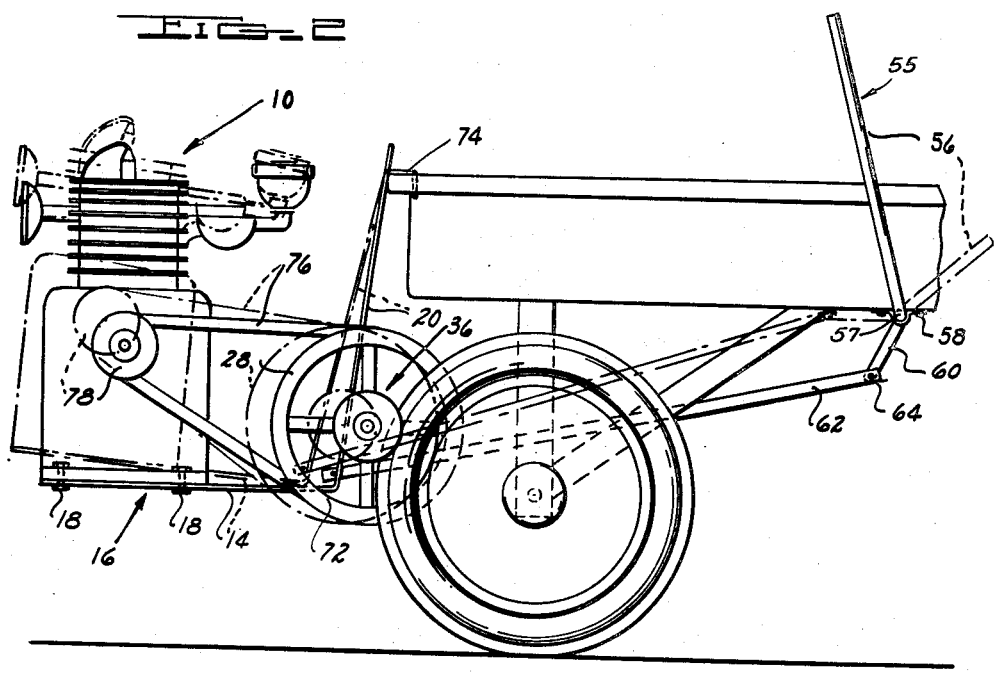
INVENTOR.
JOSEPH E. HORSTE
BY
ATTORNEY

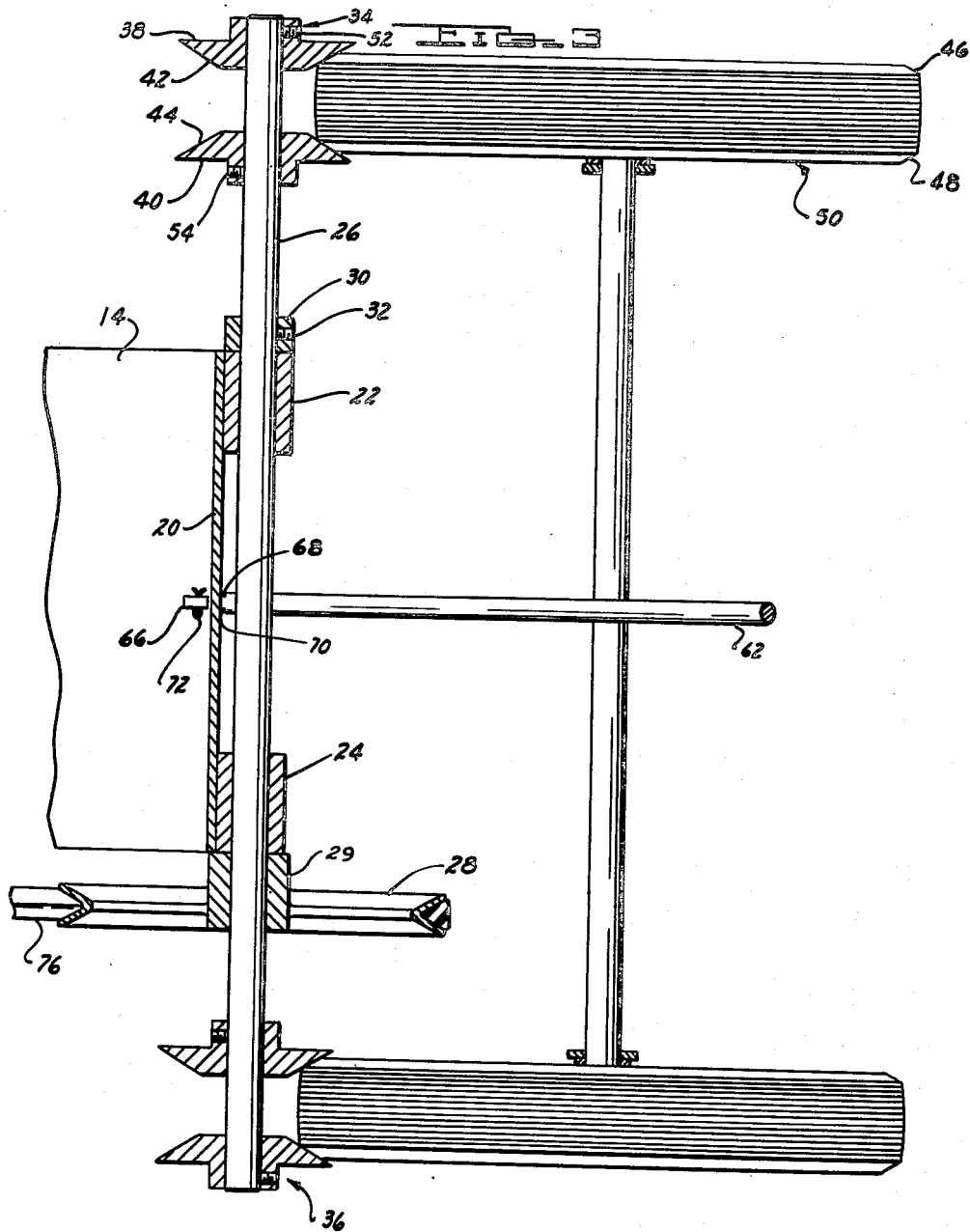

Patented Aug. 17, 1954

2,686,571

UNITED STATES PATENT OFFICE 2,686,571

MOVABLY SUPPORTED ENGINE AND DRIVE ASSEMBLY AND WHEEL DRIVE CONTROL THEREFOR

Joseph E. Horste, Belleville, Mich.

Application May 26, 1952, Serial No. 290,103

7 Claims. (Cl. 180—74)

1

The present invention relates to an engine mounting and drive assembly and more specifically to such an engine mounting and drive assembly which is adapted for detachable mounting on a child's wagon.

It is a principal object of the present invention to provide an engine mounting and drive assembly, particularly adapted for use with a child's wagon, which is simple in construction and efficient in operation, and which may be manufactured at low cost.

It is another object of the present invention to provide such an engine mounting and drive assembly having adjustable driving means which may be adapted to fit different size wheels and different wheel gauges.

Other objects of this invention will appear in the following description and appended claims, reference being had to the accompanying drawings forming a part of this specification wherein like reference characters designate corresponding parts in the several views.

In the drawings:

Fig. 1 is a side elevation of a gasoline engine mounted to a child's wagon by an engine mounting and drive assembly embodying the present invention.

Fig. 2 is an enlarged side elevation of the engine, the engine mounting and drive assembly, and a portion of the wagon shown in Fig. 1, the disengaged position of the drive assembly being shown in phantom.

Fig. 3 is a sectional view taken along the line 3—3 in the direction of the arrows, Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, a preferred embodiment of the present invention is disclosed wherein a one cylinder gasoline engine 10 is adapted to drive a child's wagon 12. The conventional one horsepower engine such as the Clinton engine has been found satisfactory. The details of the engine are not critical to the invention, and are well known, so they will not be discussed in the present application. The engine is mounted on the flat base 14 of a mounting member 16 by any suitable means such as the nut and bolt assem-

2 blies 18. A plate 20 is formed integral with the base 14 and extends upwardly at an angle thereto.

Referring particularly to Fig. 3 of the drawings, the plate 20 has a pair of aligned bearings 22 and 24 affixed to the forward face thereof on a transverse line spaced upwardly from the base 14. Extending through the bearings 22 and 24 is an axle 26. The axle is retained in the desired position on the near side by the hub 29 of axle pulley 28 and on the far side by the locking collar 30. The pulley 28 and the collar 30 are adjustably affixed to the axle 26 by means such as the set screw 32. This permits the engine mounting to be placed at any desired position relative to the axle.

A pair of driving wheels 34 and 36 are positioned at each end of the axle 26. The driving wheel 34 is comprised of a pair of discs 38 and 40 having tapered portions 42 and 44 respectively provided thereon. The tapered portions 42 and 44 are adapted to engage the shoulders 46 and 48 of the tire 50 on the rear wheel of the wagon. The discs 38 and 40 are affixed to the axle 26 by suitable means such as the set screws 52 and 54. Thus the discs may be adjusted to fit any size and positioning of the wagon wheel. The driving wheel 36 is comprised of parts identical with the component parts of the drive wheel 34. The adjustable drive wheels 34 and 36 are important since they permit the engine mounting and drive assembly of the present invention to be used with any of the various sizes wagon which are available.

The operating mechanism provided with the construction of the present invention includes a handle member 55 which is bent at substantially right angles to form a handle 56 and a transverse rod 57 which extends transversely under the wagon. The transverse rod 57 is rotatably affixed to the bottom of the wagon by the bracket 58. A lever arm 60 is disposed on the end of the transverse rod beneath the bottom of the wagon. The free end of the lever arm 60 is pivotally attached to one end of a connecting rod 62 by the pin 64. The other end of the connecting rod 62 is reduced in size to provide flange 66 and the shoulder portions 68 and 70. The flange 66 extends through an opening of approximately the same size in the plate 20 of the mounting member 16. A key 72 is inserted through a hole in the flange 66 and thus plate 20 is locked in position on the rod 62 by the shoulders 68 and 70 and the key 72.

The upper portion of the plate 20 is provided with a pair of aligned hinge fingers 74 which are adapted to fit over the rear wall of the wagon.

The hinge fingers form a fairly snug fit with the rear wall of the wagon and movement of the upright plate 20 with respect to the wagon 12 is accomplished against the tension in the metal hinge fingers.

The operative position of the drive mechanism is shown in solid lines in the drawings. The handle 56 is in the rearward position and the driving wheels 34 and 36 are engaged with the rear wheels of the wagon. The wagon wheels are driven through the axle pulley 28 by the belt 76 which is also in engagement with the driving pulley 78 on the engine 10.

To disengage the drive mechanism the handle 56 is moved forward to the position shown in phantom, Fig. 2, and the lever arm 60 is moved against the bottom of the wagon. Due to the off center arrangement of the handle 56, lever arm 60, and connecting rod 62, the connecting rod 62 tends to hold the lever arm 60 against the bottom of the wagon in the disengaged position with the aid of the weight of the engine 10 and mounting 14 against the rear portion of the rod 62. The drive mechanism will thus remain in the disengaged position until the handle 56 is returned to the rearward position. As previously explained, movement of the upright plate 20 is effected against the tension of the hinge fingers 74.

The mounting 14 with the engine 10 thereon may be quickly and easily removed by merely removing the key 72 from the end of the rod 62 and lifting the mounting upwardly from the wagon. If it is desired to use the wagon without the engine, the rod 62 may be disconnected from the lever arm 60 by removing the pin 64. The handle 56 will then hang at the side of the wagon.

From the foregoing, it will be seen that the present invention provides an engine mounting and drive assembly for use with a child's wagon, which is versatile and easy to install or remove. The engine mounting is unique and efficient and the drive mechanism is simple and sturdy. The entire unit is so constructed that it may be manufactured at low cost so that the invention may be sold at economical prices.

Having thus described my invention, I claim:

1. An engine mounting and drive assembly for use with a vehicle, comprising a mounting member having a base adapted to seat an engine and a plate extending upwardly from said base, means adjacent the upper end of the plate to pivotally mount the plate to the rear wall of the vehicle, an axle rotatably mounted to said plate and having driving wheels thereon adapted to engage the rear wheels of said vehicle, and a pulley operatively coupled with the engine, a handle member having a bearing mounting on the vehicle to selectively effect the engagement and disengagement of the driving wheels with the rear wheels of the vehicle and a connecting rod coupled with said handle member and pivotally affixed to the plate of the mounting member so that the positioning of the driving wheels is determined by the positioning of the mounting member which in turn is determined by the position of the handle member.

2. An engine mounting and drive assembly for use with a vehicle, comprising a mounting member having a base adapted to seat an engine and a plate extending upwardly from said base, means adjacent the upper end of the plate to pivotally mount the plate to the rear wall of the vehicle, an axle rotatably mounted to said plate and having driving wheels thereon adapted to engage the rear wheels of said vehicle, each of said driving wheels including a pair of disc portions which may be adjustably positioned on said axle, said axle also having a pulley thereon operatively coupled with the engine, a handle member having a bearing mounting on the vehicle to selectively effect the engagement and disengagement of the driving wheels with the rear wheels of the vehicle and a connecting rod coupled with said handle member and pivotally affixed to the plate of the mounting member so that the positioning of the driving wheels is determined by the positioning of the mounting member which in turn is determined by the position of the handle member.

3. An engine mounting and drive assembly for use with a vehicle, comprising a mounting member having a base adapted to seat an engine and a plate extending upwardly from said base, means adjacent the upper end of the plate to pivotally mount the plate to the rear wall of the vehicle, an axle rotatably mounted to said plate and having driving wheels thereon adapted to engage the rear wheels of said vehicle and a pulley thereon operatively coupled with the engine, said pulley having a hub which is in engagement with said plate, an adjustable collar spaced from said pulley on said axle on the other side of said plate, said pulley and collar being selectively movable relative to said axle to accurately position the engine mounting on the axle, a handle member having a bearing mounting on the vehicle to selectively effect the engagement and disengagement of the driving wheels with the rear wheels of the vehicle and a connecting rod coupled with said handle member and pivotally affixed to the plate of the mounting member so that the positioning of the driving wheels is determined by the positioning of the mounting member which in turn is determined by the position of the handle member.

4. An engine mounting and drive assembly for use with a vehicle, comprising a mounting member having a base adapted to seat an engine and a plate extending upwardly from said base, means adjacent the upper end of the plate to pivotally mount the plate to the rear wall of the vehicle, an axle rotatably mounted to said upright plate and having driving wheels thereon adapted to engage the rear wheels of said vehicle, each of said driving wheels including a pair of adjustable disc portions which may be selectively positioned on said axle, said axle also having a pulley thereon operatively coupled with the engine, said pulley having a hub which is in engagement with said plate, an adjustable collar spaced from said pulley on said axle on the other side of said plate, said pulley and collar being selectively movable relative to said axle to accurately position the engine mounting on the axle, a handle member having a bearing mounting on the vehicle to selectively effect the engagement and disengagement of the driving wheels with the rear wheels of the vehicle, and a connecting rod coupled with said handle member and pivotally affixed to the plate of the mounting member so that the positioning of the driving wheels is determined by the positioning of the mounting member which in turn is determined by the position of the handle member.

5. In combination, a child's wagon having a flat bottom with a wall portion therearound, an engine mounting comprising a base with a plate extending upwardly therefrom, at least one hinge finger depending from said plate and extending over the back of the wall of the wagon to hold the mounting member in position thereon, an engine having a driving pulley mounted on the base of said mounting member, an axle rotatably disposed on said plate and having driving wheels thereon in engagement with the rear wheels of the wagon, a driven pulley on said axle operatively coupled with the driving pulley of the engine through a belt, and an operating mechanism for selectively effecting the engagement and disengagement of the driving wheels with the rear wheels of the wagon including a handle member movably mounted on the wagon and a connecting rod extending from the handle member to said plate, the engine mounting being moved about the finger by the movement of said handle member to the operative or inoperative position.

6. In combination, a child's wagon having a flat bottom with a wall portion therearound, an engine mounting having an engine thereon and having driving means for transmitting motion from the engine to the rear wheels of the wagon, said mounting also having an upright plate pivotally affixed to the rear wall of the wagon, and an operating mechanism for selectively effecting the engagement and disengagement of the driving means with the rear wagon wheels including a transverse rod rotatably affixed to the bottom of the wagon, a handle extending at substantially a right angle to one end of said transverse rod along the sidewall of the wagon, a lever arm disposed at substantially a right angle to said transverse rod at the other end of said rod and extending in a different direction than said handle, and a connecting rod pivotally connected to said lever arm at one end and to the upright plate at the other end, said lever arm being in misalignment with the connecting rod against the bottom of the wagon when the driving means of the mounting is out of engagement with the rear wagon wheels and being in misalignment with the connecting rod below the bottom of the wagon when the driving means of the mounting is in engagement with the rear wagon wheels.

7. In combination, a child's wagon having a flat bottom with a wall portion therearound, an engine mounting having an engine thereon and having a driving pulley, an upright plate extending from the base of said mounting, metal hinge fingers formed on the top of said plate and disposed over the rear wall of the wagon to provide a hinge point, a pair of transversely aligned bearings affixed to the front face of said plate, an axle rotatably disposed in said bearings and having a driving wheel on each end thereof in engagement with a rear wheel of the wagon, each of said driving wheels including a pair of adjustable disc portions which may be selectively positioned on said axle, a driven pulley on said axle, said driven pulley having a hub thereon which is in engagement with one of said bearings, an adjustable collar spaced from said pulley on said axle on the other side of said plate, said pulley and collar being movable relative to said axle to accurately position the mounting on the axle, an operating mechanism for selectively effecting the engagement and disengagement of the driving wheels with the rear wheels of the wagon including a transverse rod rotatably affixed to the bottom of the wagon, a handle extending at substantially a right angle to one end of said pivotal transverse rod along the sidewall of the wagon, a lever arm disposed at substantially a right angle to said transverse rod at the other end of said rod and extending in a different direction than said handle, and a connecting rod pivotally connected to said lever arm at one end and to the upright plate at the other end, said lever arm being in misalignment with the connecting rod against the bottom of the wagon when the driving wheels of the mounting are out of engagement with the rear wagon wheels and being in misalignment with the connecting rod below the bottom of the wagon when the driving wheels of the mounting are in engagement with the rear wagon wheels.

References Cited in the file of this patent

UNITED STATES PATENTS

| Number | Name | Date |
| --- | --- | --- |
| 687,957 | Fortner | Dec. 3, 1901 |
| 1,519,660 | Breitenstein | Dec. 16, 1924 |
| 1,540,740 | Weiss | June 2, 1925 |
| 1,598,124 | Evans | Aug. 31, 1926 |
| 2,054,644 | Wulfert | Sept. 15, 1936 |
| 2,514,857 | Gottbreht | July 11, 1950 |
| 2,578,886 | Isherwood | Dec. 18, 1951 |